(12) United States Patent
Arévalo Rodríguez et al.

(10) Patent No.: US 10,696,377 B2
(45) Date of Patent: Jun. 30, 2020

(54) FUSELAGE REAR END OF AN AIRCRAFT

(71) Applicant: Airbus Operations S.L., Getafe (ES)

(72) Inventors: Elena Arévalo Rodríguez, Getafe (ES); Francisco José Cruz Domínguez, Getafe (ES); Ana Reyes Moneo Peñacoba, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 468 days.

(21) Appl. No.: 15/540,480

(22) PCT Filed: Dec. 21, 2015

(86) PCT No.: PCT/ES2015/070934
§ 371 (c)(1),
(2) Date: Jun. 28, 2017

(87) PCT Pub. No.: WO2016/107944
PCT Pub. Date: Jul. 7, 2016

(65) Prior Publication Data
US 2017/0341729 A1    Nov. 30, 2017

(30) Foreign Application Priority Data

Dec. 30, 2014    (EP) .................................. 14382584

(51) Int. Cl.
*B64C 5/02*  (2006.01)
*B64C 1/26*  (2006.01)
(Continued)

(52) U.S. Cl.
CPC ................ *B64C 5/02* (2013.01); *B64C 1/061* (2013.01); *B64C 1/12* (2013.01); *B64C 1/1446* (2013.01);
(Continued)

(58) Field of Classification Search
CPC .. B64C 1/061; B64C 1/26; B64C 1/10; B64C 1/1446; B64C 2001/0072; B64C 7/00; B64D 29/04; B64D 29/08
See application file for complete search history.

(56) References Cited

U.S. PATENT DOCUMENTS 6,474,600 B1 * 11/2002 Apps ...................... B64C 1/061
244/129.5
7,240,877 B2 *  7/2007 Cazals ................... B64D 27/20
244/54
(Continued)

FOREIGN PATENT DOCUMENTS

EP    2634086    9/2013
EP    2832636    2/2015
(Continued)

OTHER PUBLICATIONS

International Search Report, dated Apr. 15, 2016 priority document.

*Primary Examiner* — Philip J Bonzell
*Assistant Examiner* — Tye William Abell
(74) *Attorney, Agent, or Firm* — Greer, Burns & Crain, Ltd.

(57) ABSTRACT

A fuselage rear end of an aircraft, comprising a structural part comprising a skin and longitudinal and transversal reinforcing members and a fairing. The structural part longitudinally spans over the whole rear end and comprises a first portion in which the transversal reinforcing members occupy the whole perimeter of the corresponding fuselage section and at least a second portion in which the transversal reinforcing members occupy only a portion of the perimeter of the corresponding fuselage section. The fairing is located below the second portion of the structural part.

16 Claims, 6 Drawing Sheets

(51) Int. Cl.
*B64C 1/06* (2006.01)
*B64C 1/12* (2006.01)
*B64C 1/14* (2006.01)
*B64C 1/16* (2006.01)
*B64C 7/00* (2006.01)
*B64D 41/00* (2006.01)
*B64D 29/04* (2006.01)
*B64D 29/08* (2006.01)
*B64C 1/10* (2006.01)
*B64C 1/00* (2006.01)

(52) U.S. Cl.
CPC ............... *B64C 1/16* (2013.01); *B64C 1/26* (2013.01); *B64C 7/00* (2013.01); B64C 1/10 (2013.01); B64C 2001/0072 (2013.01); B64D 29/04 (2013.01); B64D 29/08 (2013.01); B64D 2041/002 (2013.01)

(56) References Cited

U.S. PATENT DOCUMENTS

| | | |
|---|---|---|
| 8,220,739 B2 | 7/2012 | Cazals |
| 2008/0099611 A1* | 5/2008 | Martino Gonzalez ....................... B64D 29/08 244/119 |
| 2010/0044502 A1* | 2/2010 | Cazals .................. B64D 27/20 244/54 |
| 2011/0101163 A1* | 5/2011 | Haack .................... B64C 1/068 244/119 |
| 2011/0233335 A1* | 9/2011 | Vinue Santolalla .... B64C 1/061 244/119 |
| 2011/0259998 A1 | 10/2011 | Sanz Martínez |
| 2012/0001023 A1* | 1/2012 | Arevalo Rodriguez ..................... B64C 1/061 244/119 |
| 2012/0085866 A1* | 4/2012 | Pina Lopez ............. B64C 1/061 244/131 |
| 2012/0138746 A1* | 6/2012 | Guillemaut ............... B64C 1/26 244/123.1 |
| 2013/0140401 A1* | 6/2013 | Cruz Dominguez ... B64C 1/061 244/119 |
| 2015/0034765 A1* | 2/2015 | Gonzalez Gozalbo ... B64C 5/16 244/120 |

FOREIGN PATENT DOCUMENTS

| | | | |
|---|---|---|---|
| GB | 724052 | 2/1955 | |
| GB | 724052 A * | 2/1955 | ............. B64D 27/20 |
| WO | 0123254 | 4/2001 | |

\* cited by examiner

FUSELAGE REAR END OF AN AIRCRAFT

CROSS-REFERENCES TO RELATED APPLICATIONS

This application claims the benefit of the European patent application No. 14382584.2 filed on Dec. 30, 2014, the entire disclosures of which are incorporated herein by way of reference.

FIELD OF THE INVENTION

The present invention refers to a rear end fuselage, more specifically it refers to an integrated carbon fiber reinforced polymer rear end fuselage.

BACKGROUND OF THE INVENTION

Known aircraft comprise a fuselage having a front portion in which a cockpit is arranged, a main portion that bears the wings and a rear fuselage that supports the horizontal and the vertical stabilizers and the auxiliary power system APS.

Usually the rear fuselage comprises a main body and a tail cone end located at the rear part of the main body.

It is known that the interface between main body and tail cone end of the rear fuselage consists of four fittings in both sections and another attachment point called a "balancer" as depicted in FIG. 1.

Due to the load concentration on these interface points, the failure of some of these fittings is one of the critical failure modes specifically for tail cone end sizing which means they have to be robust, thus implying which implies some weight penalties.

Additionally, these fittings, which are usually metallic, require specific maintenance inspections, that are difficult to perform due to lack of space when the tail cone end is small, for instance, for single aisle aircraft.

Therefore, this configuration having two separate sections, main body and tail cone end, leads to higher manufacturing and assembly operations and therefore costs.

The design of the main body of the rear fuselage depends on the high loads introduced by the empennages, mainly the vertical tail plane, VTP, and the horizontal tail plane, HTP, and the design of the tail cone end. The rear fuselage of an aircraft has additionally to be able to withstand loads from the auxiliary power system APS located in the tail cone end.

The structural elements for both elements, main body and tail cone end, are mainly the same as for the rest of the fuselage, that is to say:

Skin that is an integral element of the structure which supports aerodynamic loads. Its function is to provide and maintain the aerodynamic shape, being able to also contribute in its structural resistance.

Longitudinal structural members, for instance, stringers and beams that are primarily responsible for transferring the aerodynamic loads acting on the skin into the frames. Stringers carry loads in the longitudinal direction and provides bending stiffness to the skin reducing the skin thickness, and the beams reinforce cut outs or areas in which local loads are introduced.

Transversal structural members, for instance, frames establish the shape of the fuselage and stiffen the structure transversally, avoid the overall instability of the fuselage and can be subjected to the introduction of local loads.

Both in a T-tail aircraft and in a conventional configuration aircraft, HTP and VTP are attached to the fuselage through the main body and the generated loads are directed to the transversal structural members, more specifically to load frames.

In the main body, the horizontal tail plane, HTP, is considered as interchangeable in some cases, which must be taken into account also in the design.

Additionally, in the design of the rear fuselage other events must be taken into consideration and specifically fire requirements must also be considered.

In the state of the art, it is known to locate the auxiliary power system (APS) in the tail cone as it constitutes a possible source of fire and, as the tail cone is a secondary structure, any possible damage or fault in the tail cone would not imply a catastrophic failure. Therefore, in order to prevent possible fires in the primary structures of the aircraft, the APS is located in the tail cone, furthermore being protected from the rest of the fuselage by means of the fire compartment walls. Given that the APS requires maintenance, the skin of the tail-cone needs to incorporate a door or similar element permitting access to the APS.

In case of aircraft with T-tail configuration, there is also a fire compartment housing the APS, which is also limited in flight direction by a front firewall. This firewall shall be positioned after the high loaded frames or frames withstanding load coming from VTP. In this case, the APS and the fire compartment will be attached to the tail cone end structure as well.

Due to these fire requirements, the fire compartment has front, lateral and rear firewalls, delimited in flight direction by the front firewall which is placed a certain distance behind the main body tail cone end interface, said distance depending on the systems placed at that area and the size of the maintenance door needed for their inspection. Inside the fire compartment the APS is positioned, being the APS and the fire compartment attached to the tail cone end structure, as previously stated.

Considering the HTP interchangeability, state of the art designs have a separate main body and tail cone end in their rear fuselage in order to quickly remove and replace the HTP when the aircraft is on ground.

SUMMARY OF THE INVENTION

The above mentioned drawbacks are solved by the claimed rear fuselage which provides advantages in terms of weight, manufacturing, assembly and operability, and as consequence, in terms of cost.

An aim of the invention is to simplify the design of the whole rear fuselage structure in order to make it lighter and easier to maintain.

The rear end fuselage object of the invention comprises:
a structural part comprising a skin and longitudinal and transversal reinforcing members, and
a fairing.

The invention is characterized in that the structural part longitudinally spans over the whole rear end and comprises a first portion of the span in which the transversal reinforcing members occupy the whole perimeter of the corresponding fuselage section and at least a second portion in which the transversal reinforcing members occupy only a portion of the perimeter of the corresponding fuselage section, the fairing being located below the second portion of the structural part.

An aim of the invention is to simplify the design of the whole rear fuselage structure in order to make it lighter and easy to maintain by removing the interface between the rear fuselage and the tail cone end. This removal is done by eliminating the conventional division of the rear end into two structural sections. Instead, the rear end comprises an extended structural portion so as to comprise the upper part of the tail cone end while the lower part of the tail cone comprises a lower fairing providing access to the interior of the tail cone end.

With this configuration, the skin and some of the longitudinal reinforcing members of the structural part continuously extend over the first and the second portion of the structural part across the whole rear end. As a consequence, the skin and said longitudinal reinforcing members of the structural part are manufactured as a single piece with a single manufacturing process, for instance in one shot, in order to simplify the manufacturing process.

Additionally, the longitudinal structural elements located in the second portion of the structural part provide structural support for the APS compartment, the APS itself, the fire compartment and the lower fairing.

Since the interface points or fittings, are removed, weight and cost can be also saved. Maintenance tasks associated to these fittings can be removed. Besides, this new proposal implies maintenance savings due to interface fittings removal.

BRIEF DESCRIPTION OF THE DRAWINGS

To complete the description and in order to provide for a better understanding of the invention, a set of drawings is provided. Said drawings form an integral part of the description and illustrate preferred embodiments of the invention. The drawings comprise the following figures.

DETAILED DESCRIPTION OF THE PREFERRED EMBODIMENTS

Figure 1:
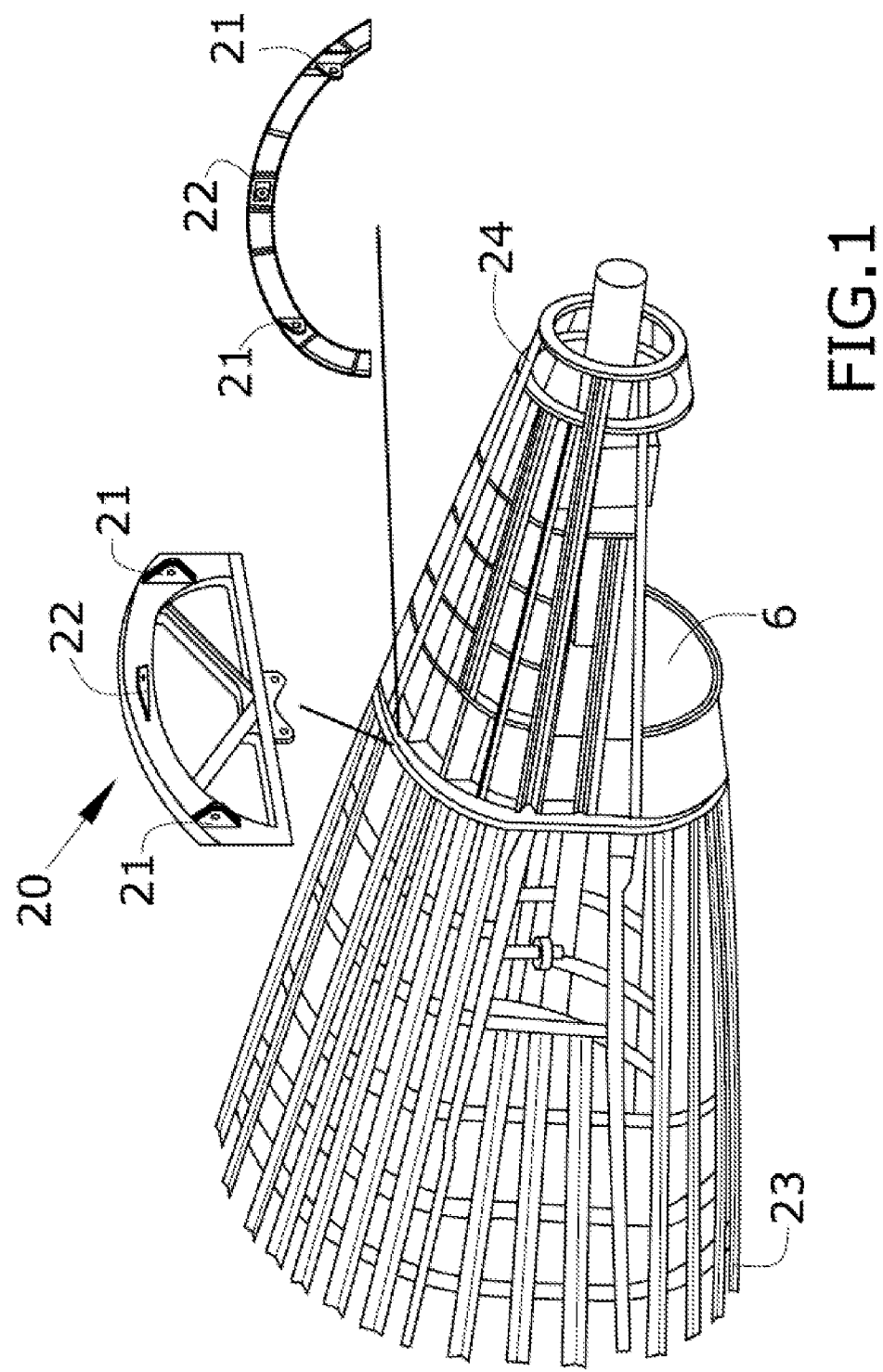
FIG. 1 shows a perspective view of a interface between the main body and the tail cone end of the state of the art.

FIG. 1 shows a known rear end fuselage that is split into two different bodies, a main body (23) and a tail cone end (24) located at the rear part of the main body (23). The interface (20) between the main body (23) and the tail cone end (24) consists in four fittings (21) in both sections (23, 24) and a balancer fitting (22).

The invention is a carbon fiber reinforced polymer integrated rear fuselage, including a structural part (1) and a lower fairing (5). In this new integrated section, some of the structural elements, for instance skin and some longitudinal structural elements (30) such as stringers and beams, can be continuous from the beginning of the rear fuselage until the end (11) of the tail cone end. Beams are used as longitudinal structural reinforcement means and some of them also have the duty of supporting the auxiliary power system (7) or reinforcing HTP or VTP cut-outs, in the claimed configuration these beams would be extended to the rear fuselage until the end (11) of the tail cone.

These elements can be manufactured in a single part for the whole length, which implies reduction of manufacturing processes/operations and assembly savings due to joint parts removal.

Regarding FIG. 2, the longitudinal (30) and transversal (31) reinforcing members comprise means for attaching an auxiliary power system (7) at the second portion (3) of the span of the structural part (1) in which the transversal reinforcing members (31) occupy only a portion of the perimeter of the fuselage. The auxiliary power system (7) is joined through struts (15) to the longitudinal reinforcing members (30) at the point at which they cross with the transversal reinforcing members (31) so that the struts (15) are joined to a strong point.

The second portion (3) of the span of the structural part (1) also comprises means for attaching a the APU compartment (8) that has to be fireproof. The fireproof compartment (8) comprises a front wall (6), a rear wall (13) and a lateral firewall (16). The lateral firewall (16) is attached to the transversal reinforcing members (31) and the skin and it also covers the internal face of the fairing (5) as depicted in FIG. 2b.

Figure 2A:
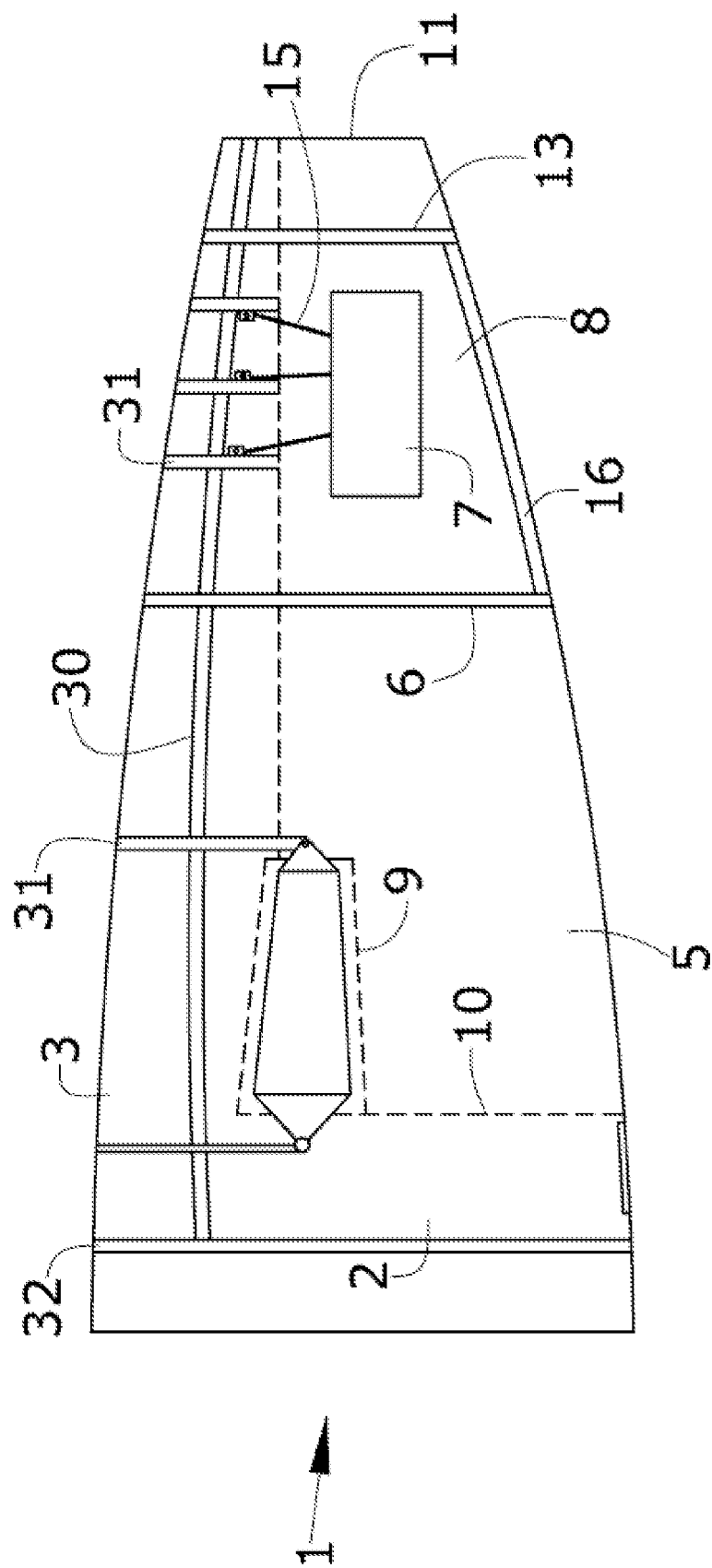
FIG. 2 shows a schematic lateral view and a cross-section of a first embodiment of the invention.
Figure 2B:
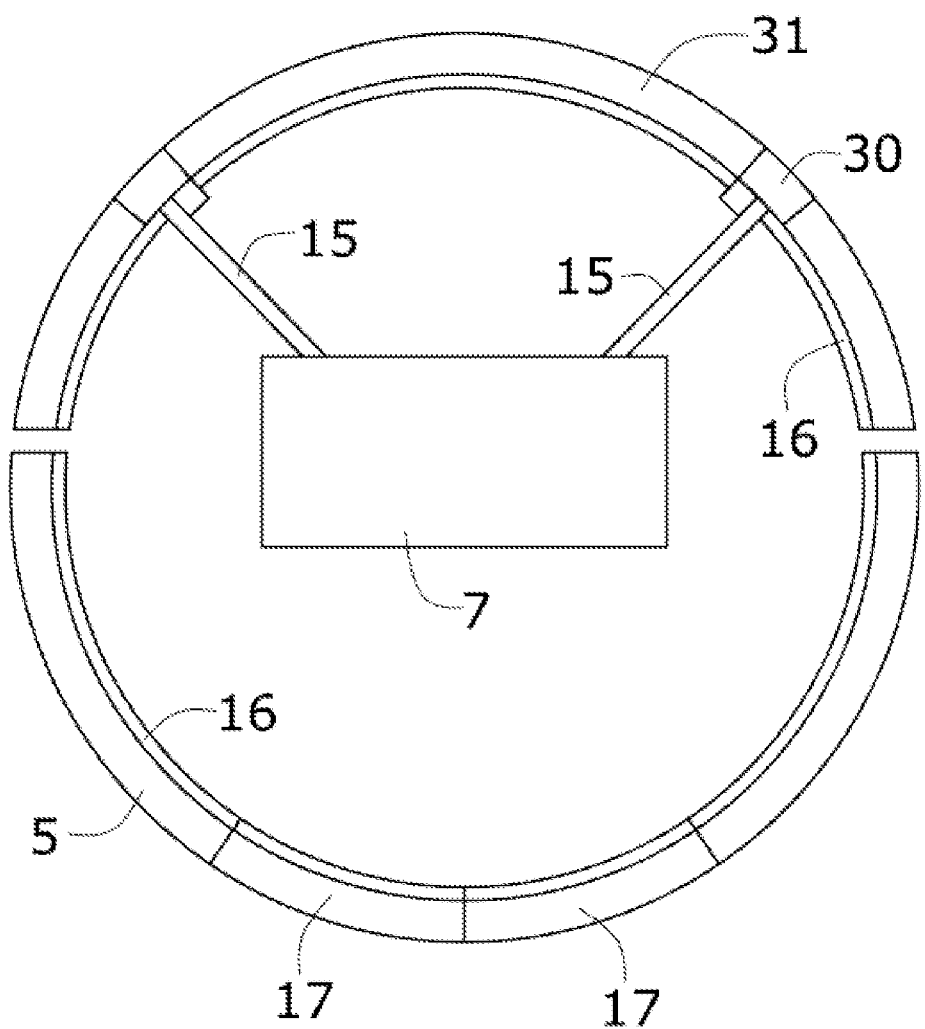

Finally, the second portion (3) of the span of the structural part (1) also comprises means for attaching the above referenced fairing (5) as depicted in FIGS. 2a and 2b.

The structural part (1) shown in FIG. 2a also comprises a cut-out (9) for attaching a horizontal tail plane.

Depending on the aircraft configuration, namely HTP mounted on fuselage or T-tail, the position of the lower fairing (5) could have different embodiments as depicted in FIG. 3.

Additionally, different configurations address the HTP disassembly/assembly process that can be made in different ways, vertically or in the flight direction. Also, depending on the extension of the lower fairing (5) with respect to the front firewall (6), there may be different embodiments.

FIGS. 3a to 3d show embodiments wherein the HTP can be assembled and disassembled from the bottom.

Figure 3A:
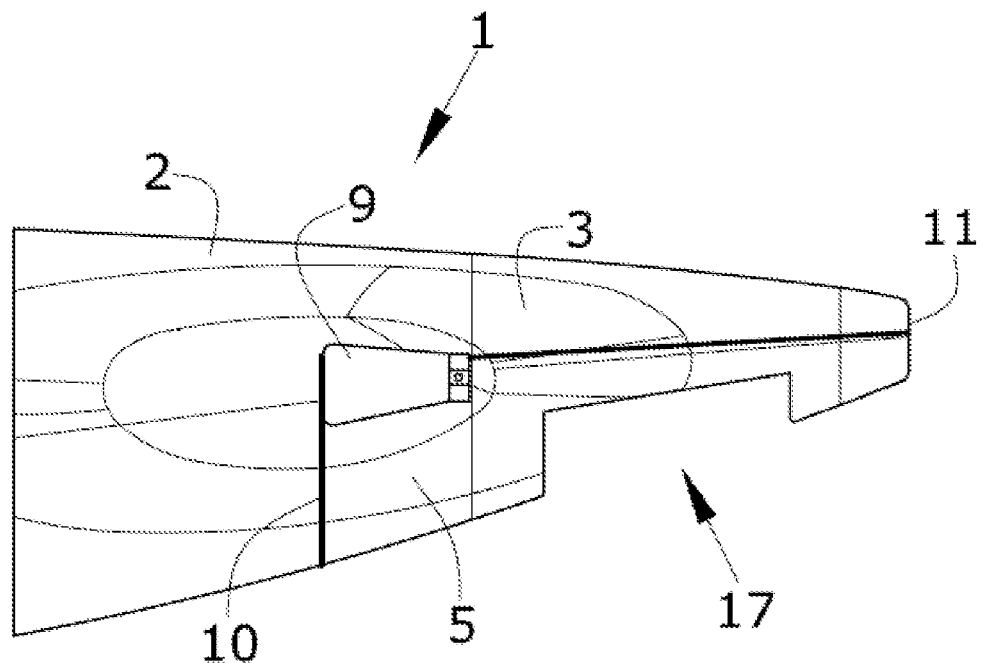
FIG. 3 shows schematic lateral views of different embodiments of the invention.

FIG. 3a shows an embodiment wherein the lower fairing (5) longitudinally extends from the fuselage section comprising the front part of the HTP cut-out (10) to the rear end (11) of the tail cone end (1). The HTP can also be assembled from the rear part.

Figure 3B:
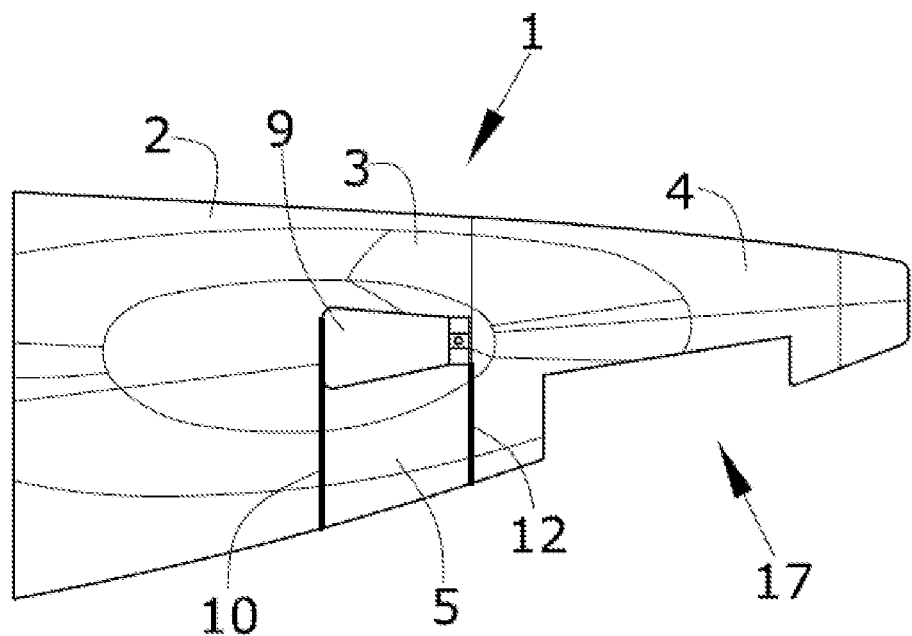

FIG. 3b shows an embodiment wherein the lower fairing (5) longitudinally extends from the fuselage section comprising the front part of the HTP cut-out (10) to the fuselage section comprising the rear part of the HTP cut-out (12).

Figure 3C:
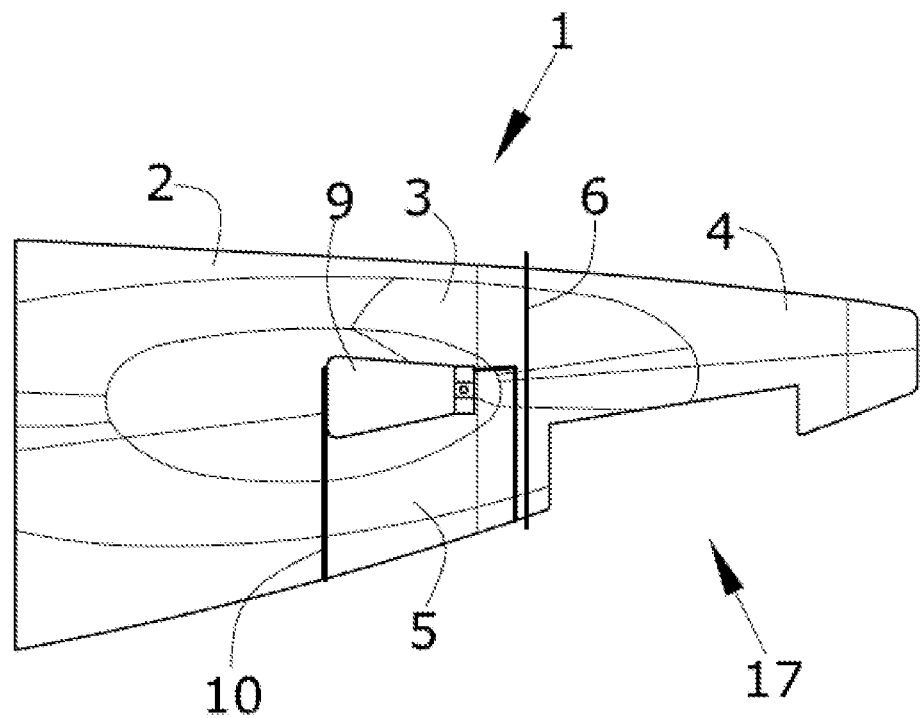
Figure 3D:
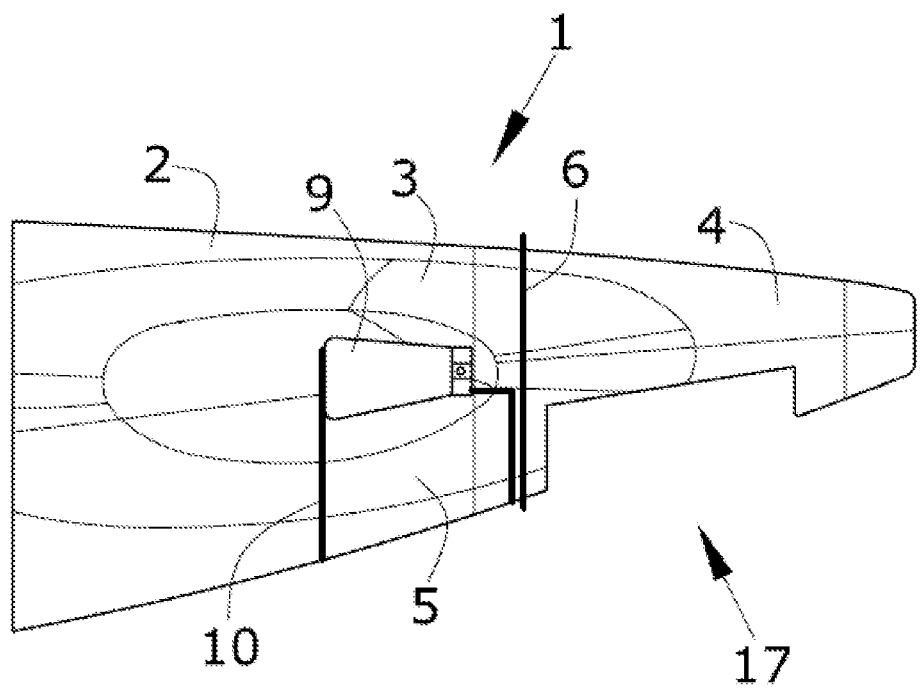

FIGS. 3c and 3d show an embodiment wherein the lower fairing (5) longitudinally extends from the fuselage section comprising the front part of the HTP cut-out (10) to the front firewall (6).

Figure 3E:
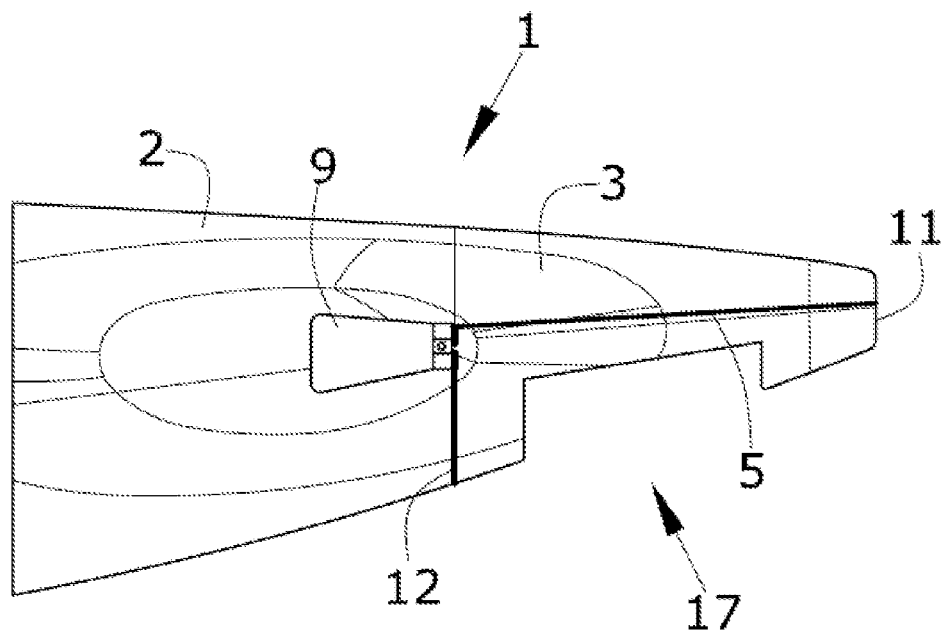

FIG. 3e shows an embodiment wherein the lower fairing (5) longitudinally extends from the fuselage section comprising the rear part of the HTP cut-out (12) to the rear end (11).

The lower fairings (5) shown in the embodiments of FIGS. 3a and 3e have advantages over the other embodiments regarding damages during manufacturing and handling operations, since the lower rear area is sometimes damaged. The fairing (5) is joined to the upper part of the structure by removable attachment means and therefore, said fairing (5) would be replaced in case of damage instead of the whole tail cone end. All these embodiments are applicable for conventional and T-tail configurations.

Figure 4:
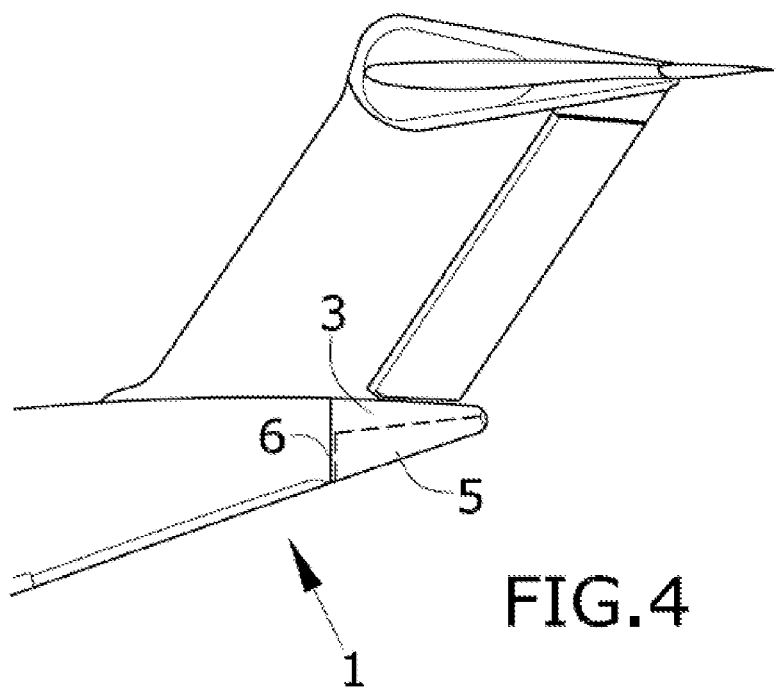
FIG. 4 shows a schematic lateral view of another embodiment of the invention.

FIG. 4 shows an embodiment for a T-tail configuration wherein the lower fairing (5) longitudinally extends from the front firewall (6) to the rear end (11). In a T-tail configuration, the lower fairing (5) could be bigger than in an HTP configuration since no HTP is located inside the structural part (1). Additionally, the front firewall (6) could be moved forward increasing the space for systems and maintenance tasks in the tail cone end since there are not limitations because HTP is not mounted on the fuselage.

The fairing would extend up to the front firewall (6) or the interface between the first and second portion of the structural part.

The rear end of the fuselage comprises maintenance doors (17) to gain access to the APS compartment (8) and to the HTP cut-out (9) to inspect and maintain actuator and the pivot point of the HTP. Depending on the configuration, said maintenance doors (17) can be located in the lower fairing (5) or adjacent to a third portion (4) of the structural part (1) in which the transversal reinforcing members occupy only a portion of the perimeter of the corresponding fuselage section, being the maintenance door (17) located below the third portion (4) of the structural part.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fuselage rear end of an aircraft, comprising:
a structural part comprising a skin, longitudinal reinforcing members, and transversal reinforcing members; and
a fairing;
the structural part longitudinally spanning over a whole of the fuselage rear end and comprising a first portion in which the transversal reinforcing members occupy a perimeter of a first corresponding fuselage section and at least a second portion in which the transversal reinforcing members occupy only a portion of the perimeter of a second corresponding fuselage section, and wherein the skin and some of the longitudinal reinforcing members continuously extend over the first portion and the second portion of the structural part across the whole of the fuselage rear end;
the fairing being located below the second portion of the structural part.

2. The fuselage rear end, according to claim 1, further comprising an auxiliary power system at the second portion of the structural part joined through struts to the longitudinal reinforcing members at a point at which the longitudinal reinforcing members are joined to the transversal reinforcing members.

3. The fuselage rear end, according to claim 1, further comprising a fire compartment having a front wall, a rear wall and a lateral firewall located at the second portion of the span, wherein the lateral firewall is attached to the transversal reinforcing members, while in the fairing, the lateral firewall covers an internal face of the fairing.

4. The fuselage rear end, according to claim 1, wherein the structural part further comprises a third portion in which the transversal reinforcing members occupy only a portion of the perimeter of a third corresponding fuselage section, a maintenance door being located below the third portion of the structural part.

5. The fuselage rear end, according to claim 1, wherein the fairing further comprises a maintenance door.

6. The fuselage rear end, according to claim 1, further comprising a front firewall located in a fuselage section of the fuselage rear end.

7. The fuselage rear end, according to claim 6, wherein the fairing longitudinally spans from the front firewall to a rear end of the fuselage rear end.

8. The fuselage rear end, according to claim 1, wherein the structural part comprises load transversal reinforcing members configured to attach at least one of a horizontal tail plane or a vertical tail plane to the fuselage rear end.

9. The fuselage rear end, according claim 8, wherein the fuselage rear end comprises a cut-out for receiving the vertical tail plane.

10. The fuselage rear end, according to claim 1, wherein the fuselage rear end comprises a cut-out configured to receive a horizontal tail plane.

11. The fuselage rear end, according to claim 10, wherein the fairing longitudinally spans from a front part of the horizontal tail plane cut-out to a rear end of the fuselage rear end.

12. The fuselage rear end, according to claim 10, wherein the fairing longitudinally spans from a front part of the horizontal tail plane cut-out to a rear part of the horizontal tail plane cut-out.

13. The fuselage rear end, according to claim 10, wherein the fairing longitudinally spans from a rear part of the horizontal tail plane cut-out to a rear end of the fuselage rear end.

14. The fuselage rear end, according to claim 10, further comprising a front firewall located in a fuselage section of the fuselage rear end, wherein the fairing longitudinally spans from a front part of the horizontal tail plane cut-out to the front firewall.

15. A fuselage rear end of an aircraft, comprising:
a structural part comprising a skin, longitudinal reinforcing members, and transversal reinforcing member; and
a fairing,
the structural part longitudinally spanning over a whole of the fuselage rear end and comprising a first portion in which the transversal reinforcing members occupy a perimeter of a first corresponding fuselage section and at least a second portion in which the transversal reinforcing members occupy only a portion of the perimeter of a second corresponding fuselage section;
the fairing being located below the second portion of the structural part wherein the structural part, the skin, and the longitudinal reinforcing members are manufactured as a single piece in the same curing cycle.

16. An aircraft comprising the fuselage rear end according to claim 1.

* * * * *